United States Patent [19]

Minderman

[11] Patent Number: 5,011,615

[45] Date of Patent: Apr. 30, 1991

[54] METHOD AND APPARATUS FOR INHIBITING ORGANISM GROWTH IN MARINE MOTORS

[76] Inventor: David J. Minderman, 25901 Rustic La., Westlake, Ohio 44145

[21] Appl. No.: 434,353

[22] Filed: Nov. 13, 1989

[51] Int. Cl.⁵ .......................... B01D 1/50; B01D 21/14
[52] U.S. Cl. .................................... 210/764; 210/205; 210/238; 422/28; 422/263; 440/88
[58] Field of Search ...................... 210/198.1, 205, 206, 210/237, 238, 749, 764; 422/28, 263, 265; 440/88, 113

[56] References Cited

U.S. PATENT DOCUMENTS

| | | | |
|---|---|---|---|
| 3,505,758 | 4/1970 | Willisford | 43/131 |
| 3,886,889 | 6/1975 | Burger | 115/0.5 R |
| 3,931,828 | 1/1976 | Lawler | 440/88 |
| 4,065,325 | 12/1977 | Maloney | 134/167 R |
| 4,108,190 | 8/1978 | Carlson | 134/167 R |
| 4,121,948 | 10/1978 | Guhlin | 440/88 |
| 4,218,843 | 8/1980 | Clark, Jr. | 43/131 |
| 4,246,863 | 1/1981 | Reese | 440/88 |
| 4,359,063 | 11/1982 | Carlson | 134/167 R |
| 4,540,009 | 9/1985 | Karls | 134/167 R |
| 4,589,851 | 5/1986 | Karls | 440/88 |
| 4,869,695 | 9/1989 | Sajdak, Jr. | 440/88 |

FOREIGN PATENT DOCUMENTS 2091662  8/1982  United Kingdom ................. 440/88

OTHER PUBLICATIONS

Ikuta, et al., *Biofouling Control Using a Synergistic Hydrogen Peroxide and Ferrous Ion Technique*, presented at the 49th Annual Meeting International Water Conference, Pittsburgh, Pa., Oct. 24–26, 1988.

Y. G. Mussalli, *Control Biofouling with Low Environmental Impact*, Stone & Webster Engineering Corp., Boston, Mass., Published in Ocean Industry, Jan. 1989.

Griffiths, et al., *The Zebra Mussel, Dreissena Polymorpha (Pallas. 1771) in North America: Impact on Raw Water Users*, Manuscript for Symposium: Service Water System Problems Affecting Safety Related Equipment, Charlotte, N.C., Nov. 6–8, 1989.

Diaz-Tous, et al., ed., *Symposium on Condenser Macrofouling Control Technologies*, Proceedings, Dec. 1983, Hyannis, Mass., Jun. 1–3, 1983.

*Primary Examiner*—W. Gary Jones
*Attorney, Agent, or Firm*—Fay, Sharpe, Beall Fagan, Minnich & McKee

[57] ABSTRACT

A device for controlling the growth of organisms in the cooling water inlets (7a and 7b) in outboard or stern drive motors. The device comprises of a resilient collar (1) that is placed over the cooling water inlets (7a and 7b) in such a way as to trap a small amount of water (9) inside of and immediately adjacent to the cooling water inlets (7a and 7b). On one side of the collar (1), near one inlet (7a and 7b), a cavity (6) for holding and releasing a treatment chemical (8) is provided. The water (9) trapped in the cooling water inlets (7a and 7b) slowly dissolves the treatment chemical (8), releasing a biocide, thus inhibiting the growth of the targeted organism. A handle (2) is provided so that the collar (1) can be readily installed and removed from the stern of the boat without removal of the boat from water (9).

8 Claims, 3 Drawing Sheets

METHOD AND APPARATUS FOR INHIBITING ORGANISM GROWTH IN MARINE MOTORS

BACKGROUND—FIELD OF THE INVENTION

This invention related in general to methods and apparatus for inhibiting the growth of organisms in outboard or stern-drive motors.

BACKGROUND—DESCRIPTION OF PRIOR ART

Outboard and stern-drive motors that remain in the water for an extended period of time are subject to infestation of the cooling water inlets and passages by various organisms, such as mollusks. In a relatively short time, these organisms multiply and grow to a point where both the cooling water inlets and internal passages become clogged, subjecting the engine to overheating and subsequent damage.

In the past, organisms were controlled by several prior art methods. They included specially designed cooling water inlets with screens, anti-fouling paint, and flushing devices. The anti-fouling paint and specially designed cooling water inlets are effective in controlling organisms such as sea weeds, algae, and small fish. However, these methods have had little effect on mollusks, such as the zebra mussel (Dreissena Polymorphia) which has recently appeared in the Great Lakes of North America. The use of flushing devices for control of these organisms is impractical since these require the boat be removed from the water, and regular tap water may not kill the organisms.

SUMMARY OF THE INVENTION

It is the broad object of this invention to provide an improved method for controlling the growth of organisms in and around the cooling water inlet passages of outboard or stern-drive motors. A more specific object of this invention is to provide a means to treat the water immediately adjacent to and inside the cooling water inlets with a biocide that will inhibit the growth of organisms. Further, since the volume of water treated is relatively small, there is virtually no adverse ecological impact.

Another object of this invention is to allow for the convenient installation and removal of the device while the boat is still in the water. These and other objects are realized in accordance with the present invention in an apparatus comprising a resilient collar that is placed over the cooling water inlets in such a way as to trap a small amount of water inside of and immediately adjacent to the cooling water inlets. On one side of the collar, near one inlet, a cavity for holding and releasing a treatment chemical is provided. The water trapped in the cooling water inlets slowly dissolves the treatment chemical, releasing a biocide, thus inhibiting the growth of the targeted organism. A handle is provided so that the collar can be readily installed and removed from the stern of the boat without removal of the boat from water.

These and other objects, features, and advantages will be better understood from a detailed study of the invention with reference to the attached drawings.

REFERENCE NUMERALS IN DRAWING

1. Collar
2. Handle
3. Handle Grip
4. Lower Unit
5a. Recess
5b. Recess
6. Treatment Cavity
7a. Cooling Water Inlet
7b. Cooling Water Inlet
8. Chemical Tablet
9. Water

DETAILED DESCRIPTION OF THE INVENTION

Figure 1:
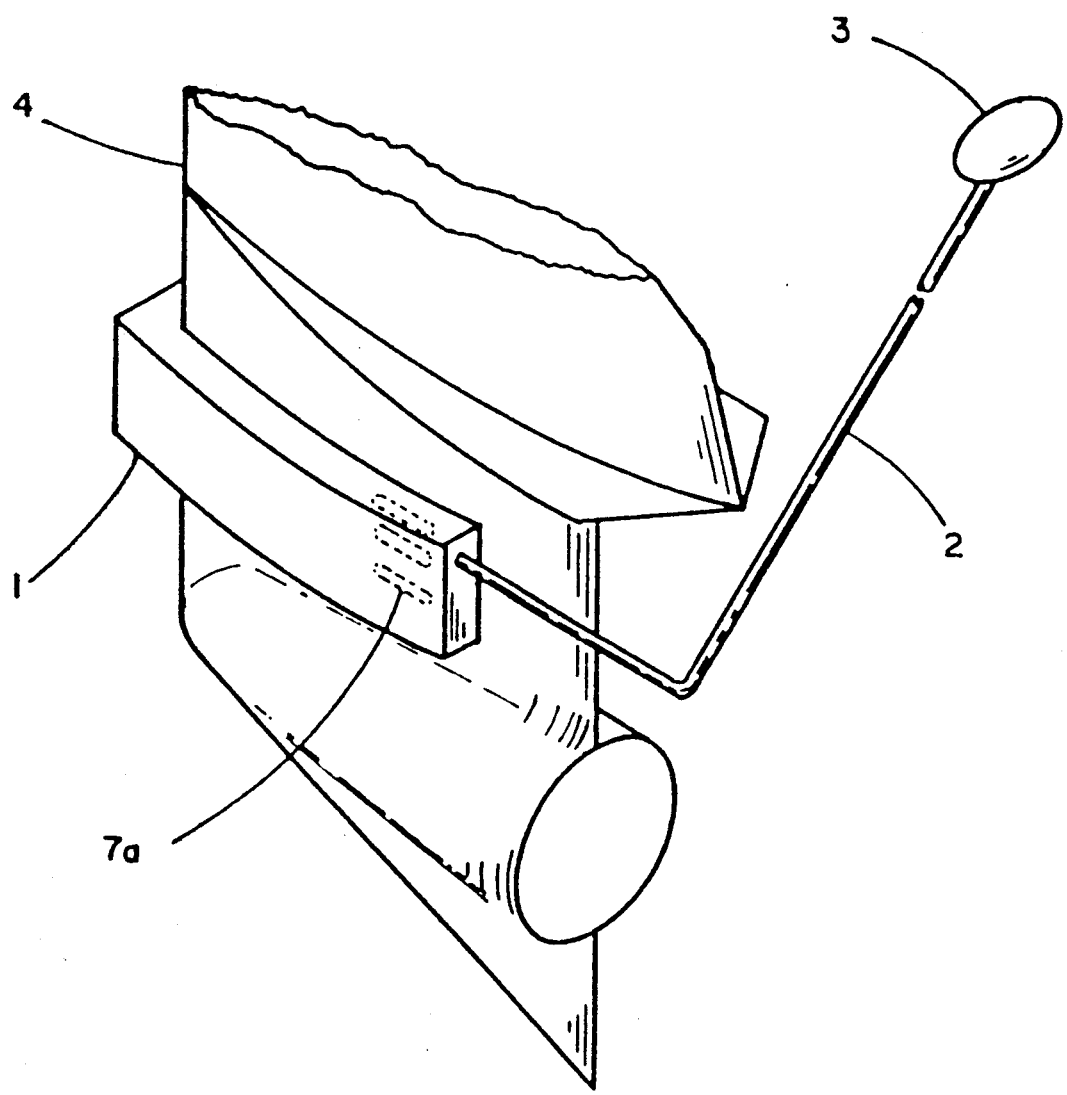
FIG. 1 is a perspective view of one embodiment of the device as installed on an outboard or stern drive motor.
Figure 2:
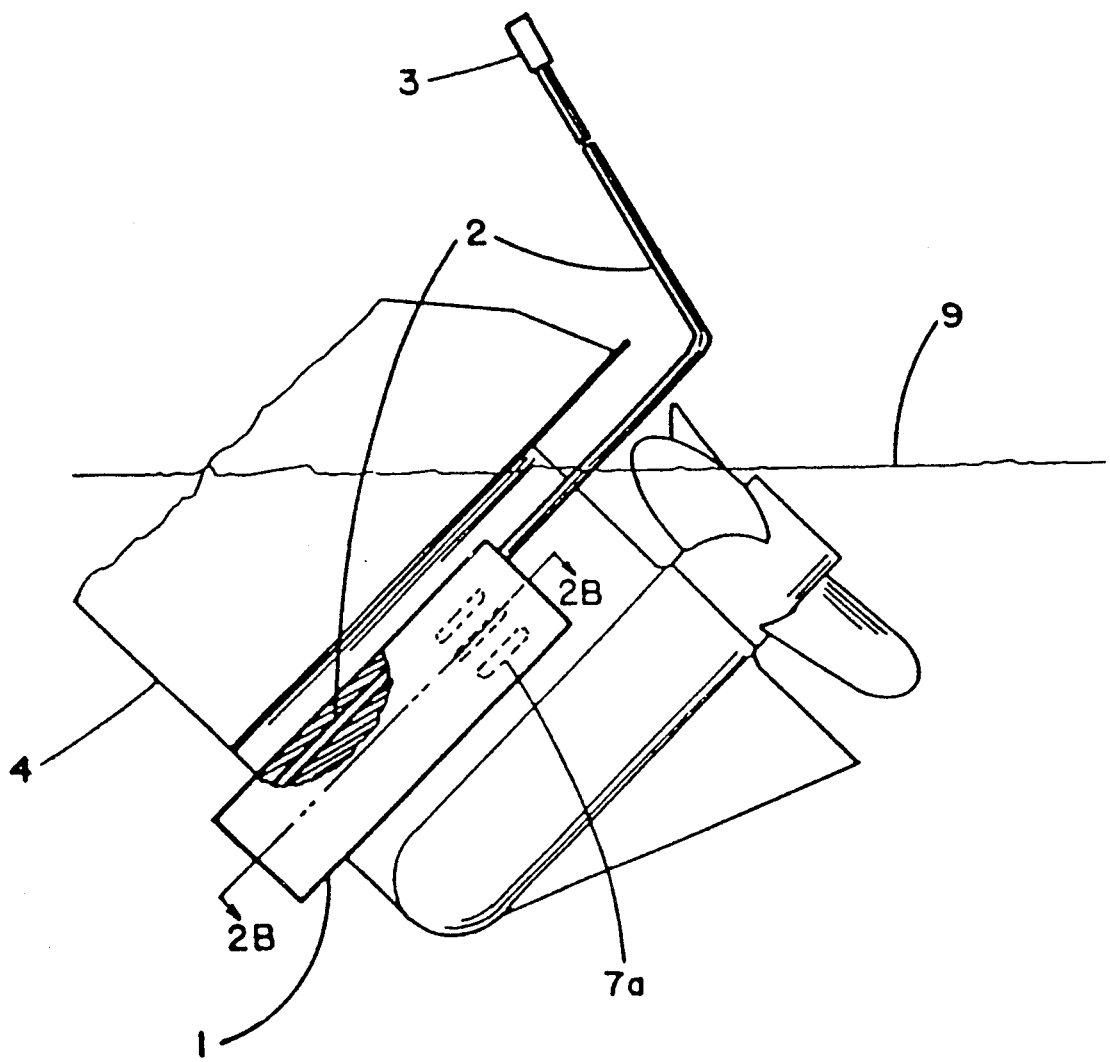
FIG. 2 is a side elevation of the embodiment as installed.

Referring to FIG. 1 and 2 of the drawings, 4 indicates the lower motor housing of a typical outboard or stern-drive motor having two sets of interconnected cooling water inlet ports 7a and 7b. In this case, three elongated elliptical inlet ports are shown. The lower unit 4 is shown in the tilted up position in FIG. 2. For clarity, the propeller is not shown on the lower unit 4 in FIG. 1.

A collar 1 is designed to be installed so as to be in direct contact with lower unit 4 so as to cover each set of intake ports 7a and 7b. In the preferred embodiment, the collar 1 is made of a resilient foamed polymer, for example, polyethylene foam, so that the device floats in water 9 and tends to hold the collar 1 in place. For additional assistance in holding the collar 1 in direct contact with the lower unit 4, the handle 2 wraps around the collar, providing a slight spring force that grips the lower unit 4. The handle 2 is made of a corrosion resistant metal such as stainless steel or aluminum and extends from the collar 1 at such an angle and length to allow the device to be installed and removed from the stern of the boat while the lower unit 4 is in the tilted up position and the boat is in the water 9. The handle grip 3, attached to the end of the handle 2, allows for easy handling of the device. The handle grip 3 could be given a bright color so as to remind the boater to remove the device before starting the engine.

Figure 2B:
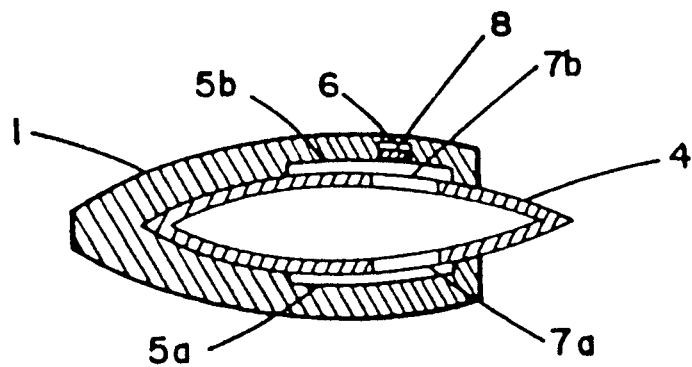
FIG. 2B is a cross section of the embodiment.

Referring to FIG. 2B shows a cross section of the invention as installed over the cooling water inlets 7a and 7b. The recesses 5a and 5b, trap a small amount of water as the device is installed. The water slowly dissolves a chemical tablet 8 that has been inserted into the treatment cavity 6. As the chemical tablet 8 dissolves, it releases an appropriate dosage of a biocide that diffuses into the recesses 5a and 5b and into the cooling water inlets 7a and 7b. The biocide then acts to inhibit the growth of the targeted organism.

Figure 3:
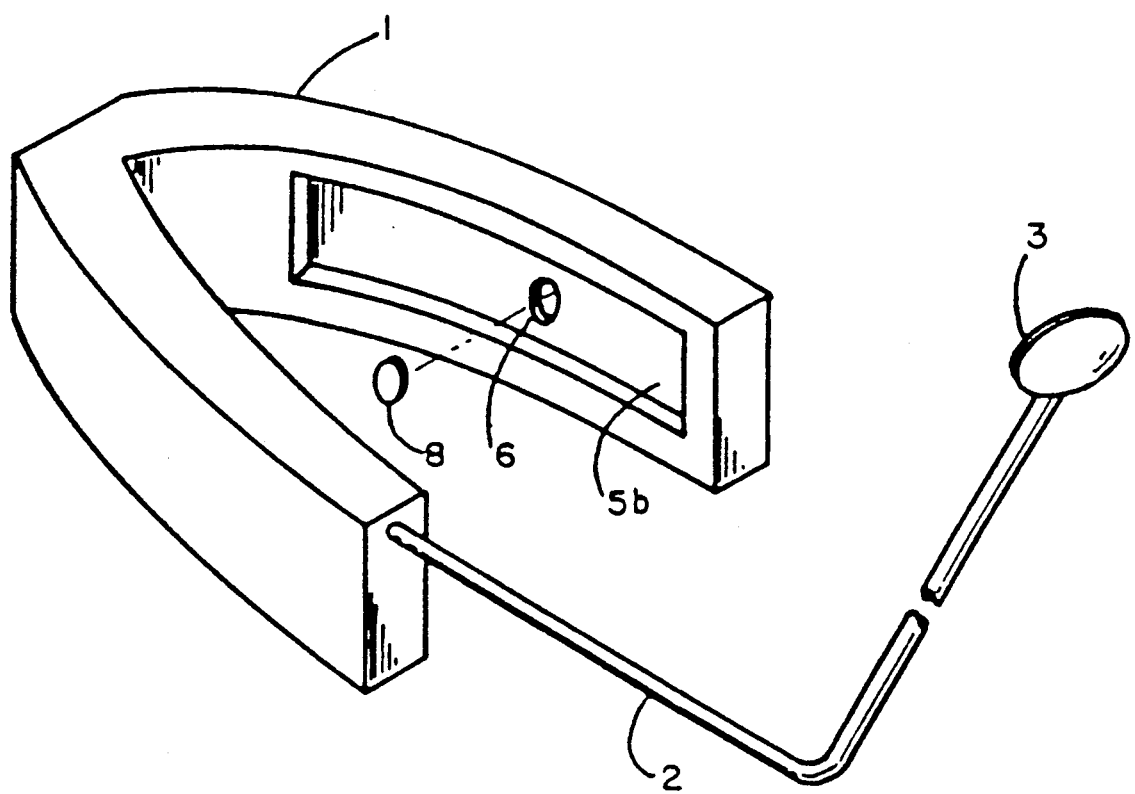
FIG. 3 is a perspective of the embodiment showing details of the side closest to the outboard or stern-drive motor.

FIG. 3 provides a perspective view that allows for a somewhat clearer view of the components of the device.

Thus the reader will see that the invention described herein provides a simple, safe, convenient, and effective means of controlling the growth of certain organisms that would otherwise clog the cooling water inlets of an outboard or stern-drive motor.

CONCLUSIONS, RAMIFICATIONS, AND SCOPE OF INVENTION

While the above description contains many specificities, these should not be construed as limitations of the scope of the invention, but rather as an exemplification of one preferred embodiment thereof. Many other variations are possible. For example, the collar 1 could be made of an elastomer rather than a foam. Also, the handle 2 and collar 1 could have different configurations to allow for use on different styles of outboard or sterndrive motors. The chemical tablet 8 and cavity 6 do not have to be round, but could be of any shape or size.

Accordingly, the scope of the invention should be determined not by the embodiment illustrated, but by the appended claims and their legal equivalents.

What is claimed is:

1. A method for chemically treating statically contained water within cooling water passages of outboard or stern-drive motors, the method comprising:
   providing a substance holder having a cavity being adapted for fluid communication with inlets of the cooling water passages;
   placing a biocidic treatment substance in the cavity of the substance holder;
   placing said substance holder over the inlets of said cooling water passages to seal the cooling water passages and cavity against egress of the treatment substance and the statically contained water; and,
   diffusing said biocidic treatment substance throughout the statically contained water in said cooling water passages.

2. The method for chemically treating statically contained water within cooling water passages of outboard or stern-drive motors in accordance with claim 1 further comprising lodging a solid water soluble treatment substance containing a molluskicide designed to inhibit organism growth into the cavity of the substance holder.

3. A system for chemically treating marine motor cooling passages, said system comprising:
   a biocidic treatment substance;
   means for holding the biocidic treatment substance in a first cavity in direct communication with inlets of said cooling water passages, the holding means having:
   means for sealing the first cavity means in direct communication with the inlets of said cooling water passages;
   restricting means for totally restricting net fluid flow through the marine motor cooling passages, and;
   a handle extending from said restricting means for manually installing and removing said device.

4. The chemical treatment system for outboard or sterndrive motor cooling passages in accordance with claim 3 wherein said biocidic treatment substance is a water soluble tablet impregnated with molluskicide designed to inhibit organism growth.

5. A method for purging marine engine cooling water passages of mollusks having migrated thereto through cooling water inlets, the method comprising the steps of:
   sealing the cooling water inlets against fluid flow to define a first cavity immediately adjacent and outside the cooling water inlets of the marine engine, and a second cavity being defined by the cooling water passages and inside the cooling water inlets;
   disposing a biocide in the first cavity, and;
   diffusing fluid in the first cavity into the second cavity so as to administer the biocide within the cooling water passages.

6. The method of claim 5 further comprising the steps of:
   disposing a solid tablet impregnated with the biocide into the fluid of the first cavity, and;
   dissolving, in the first cavity, the solid tablet impregnated with the biocide.

7. For use with a marine engine having a cooling water inlet disposed in an outdrive portion of the engine, a cooling water outlet, and a cooling water passage connecting the inlet with the outlet for flow of cooling water therebetween, an apparatus for removing mollusks from at least a portion of the passage comprising:
   a biocide substance; biocidic substance holding means or holding the biocidic substance in close fluid communication with the cooling water inlet;
   sealing means for sealing the holding means and substance therein against the outdrive portion to restrict the flow of the cooling water through the cooling water passage and for restricting migration of the biocidic substance away from the cooling water inlet, and;
   clamp means for positioning the sealing means against the outdrive portion to surroundingly cover the cooling water inlet.

8. In combination with a marine engine having a cooling water inlet disposed in an outdrive portion of the engine, a cooling water outlet, and a cooling water passage connecting the inlet with the outlet for flow of cooling water therebetween, an apparatus for removing mollusks from at least a portion of the passage comprising:
   a biocidic substance; biocidic holding means for holding the biocidic substance in close fluid communication with the cooling water inlet;
   sealing means for sealing the holding means and substance therein against the outdrive portion to restrict the flow of the cooling water through the cooling water passage and for restricting migration of the biocidic substance away from the cooling water inlet, and;
   clamp means for positioning the sealing means against the outdrive portion to surroundingly cover the cooling water inlet.

* * * * *